United States Patent
Hassani et al.

(10) Patent No.: US 10,814,832 B2
(45) Date of Patent: Oct. 27, 2020

(54) SYSTEMS AND METHODS FOR VEHICLE LOW POWER SECURITY CHALLENGE

(71) Applicant: Ford Global Technologies, LLC, Dearborn, MI (US)

(72) Inventors: Ali Hassani, Ann Arbor, MI (US); Vivekanandh Elangovan, Canton, MI (US)

(73) Assignee: Ford Global Technologies, LLP, Dearborn, MI (US)

( * ) Notice: Subject to any disclaimer, the term of this patent is extended or adjusted under 35 U.S.C. 154(b) by 0 days.

(21) Appl. No.: 16/270,799

(22) Filed: Feb. 8, 2019

(65) Prior Publication Data
US 2020/0254968 A1    Aug. 13, 2020

(51) Int. Cl.
*B60R 25/20* (2013.01)
*H04B 17/318* (2015.01)
*B60R 25/102* (2013.01)
*B60R 25/24* (2013.01)

(52) U.S. Cl.
CPC ........ *B60R 25/2072* (2013.01); *B60R 25/102* (2013.01); *B60R 25/24* (2013.01); *H04B 17/318* (2015.01); *B60R 2325/205* (2013.01)

(58) Field of Classification Search
None
See application file for complete search history.

(56) References Cited

U.S. PATENT DOCUMENTS

| | | | |
|---|---|---|---|
| 5,848,168 A * | 12/1998 | Shipps | F01N 1/065 381/71.5 |
| 6,747,545 B2 | 6/2004 | Nowottnick et al. | |
| 9,210,152 B2 | 12/2015 | Koh | |
| 10,544,606 B2 * | 1/2020 | Sasadate | E05B 77/48 |
| 2004/0113765 A1* | 6/2004 | Suitsu | B60C 23/0408 340/445 |
| 2005/0237220 A1* | 10/2005 | Nolan | B60R 25/24 340/12.34 |
| 2006/0083406 A1* | 4/2006 | Ishimura | B60R 25/24 382/106 |
| 2008/0024322 A1* | 1/2008 | Riemschneider | G06K 7/0008 340/904 |

(Continued)

FOREIGN PATENT DOCUMENTS

CN    202970174 U    6/2013

OTHER PUBLICATIONS

US 8,482,383 B2, 07/2013, Ghabra et al. (withdrawn)

*Primary Examiner* — Chico A Foxx
(74) *Attorney, Agent, or Firm* — Frank Lollo; Eversheds Sutherland (US) LLP

(57) ABSTRACT

Vehicles and methods are disclosed for enabling low power security checks to be performed on attempted access to a vehicle. An example vehicle includes a communication system having a low frequency antenna for communication with a vehicle unlocking device and a processor. The processor is configured to vary a gain in a low frequency signal transmitted to the vehicle unlocking device via the communication system, determine, based on a response from the vehicle unlocking device, that the vehicle unlocking device is a suspected attack device, responsively perform a security check on the vehicle unlocking device, and transmit an alert based on the security check.

16 Claims, 3 Drawing Sheets

(56) References Cited

U.S. PATENT DOCUMENTS

| | | | |
|---|---|---|---|
| 2010/0148986 A1* | 6/2010 | Aunkofer | B60C 23/0418 340/12.5 |
| 2010/0188192 A1 | 7/2010 | Lumley et al. | |
| 2012/0268242 A1* | 10/2012 | Tieman | B60R 25/24 340/5.61 |
| 2013/0227648 A1* | 8/2013 | Ricci | G06F 21/85 726/3 |
| 2014/0066053 A1* | 3/2014 | Burke | H04W 4/00 455/426.1 |
| 2014/0176304 A1 | 6/2014 | Park | |
| 2014/0266587 A1* | 9/2014 | Lopez | G07C 9/00309 340/5.61 |
| 2015/0022332 A1* | 1/2015 | Lin | G07C 9/00309 340/426.1 |
| 2015/0145646 A1* | 5/2015 | Seino | G07C 9/00309 340/5.61 |
| 2015/0248801 A1* | 9/2015 | Froitzheim | B60R 25/406 340/5.61 |
| 2016/0098871 A1* | 4/2016 | Oz | G01S 19/14 340/5.61 |
| 2016/0125675 A1* | 5/2016 | Ziller | G07C 9/20 340/5.72 |
| 2016/0297397 A1* | 10/2016 | Ko | B60R 25/04 |
| 2018/0099643 A1* | 4/2018 | Golsch | H04W 4/30 |
| 2018/0206184 A1* | 7/2018 | Bahr | H04W 48/20 |
| 2018/0257607 A1* | 9/2018 | Leconte | B60R 25/04 |
| 2020/0055488 A1* | 2/2020 | Rezende | H04W 12/0017 |

\* cited by examiner

SYSTEMS AND METHODS FOR VEHICLE LOW POWER SECURITY CHALLENGE

TECHNICAL FIELD

The present disclosure generally relates to vehicle communication, and, more specifically, systems and methods for low power security challenges for devices attempting to communicate with and control the vehicle.

BACKGROUND

Modern vehicles may include many functions that can be controlled remotely, such as unlocking or locking, remote park assist, and changing various vehicle settings. These functions operate based on communication with a remote device, such as a key fob, mobile device, or other device in communication with the vehicle.

The use of remote control of various vehicle functions can be an attack vector for gaining unauthorized control of the vehicle. As such, one or more security features may be used to ensure that only designated devices are able to control the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown enabling a vehicle to perform a low power security check on a device attempting to control the vehicle. An example disclosed vehicle includes a communication system having a low frequency antenna for communication with a vehicle unlocking device, and a processor. The processor is configured to vary a gain in a low frequency signal transmitted to the vehicle unlocking device via the communication system. The processor is also configured to determine, based on a response from the vehicle unlocking device, that the vehicle unlocking device is a suspected attack device. The processor is further configured to responsively perform a security check on the vehicle unlocking device, and transmit an alert based on the security check.

An example disclosed method includes varying, by a processor of a vehicle, a gain in a low frequency signal transmitted to a vehicle unlocking device via a communication system of the vehicle. The method also includes determining, based on a response received by the vehicle from the vehicle unlocking device, that the vehicle unlocking device is a suspected attack device. The method further includes responsively performing a security check on the vehicle unlocking device. And the method still further includes transmitting an alert based on the security check.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
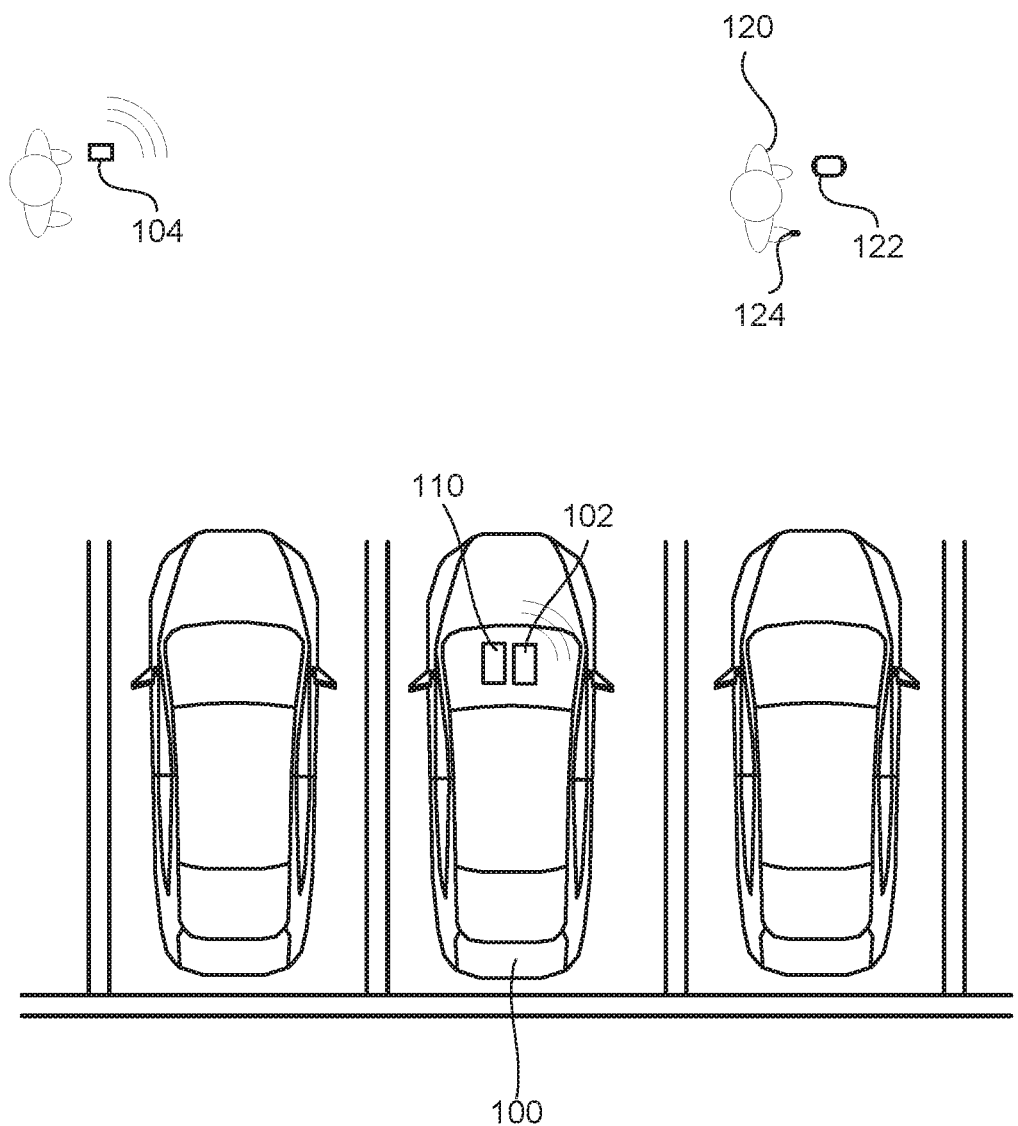
FIG. 1 illustrates an example vehicle, vehicle owner, and suspected attacking device according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, vehicles may include the ability to carry out functions based on communication with a device remote from the vehicle, such as a key fob, mobile device, and others. In many cases, it is beneficial to ensure that the remote device is authorized or permitted to control the vehicle. This can sometimes be accomplished via the used of encrypted communication and/or cryptographic challenges. Some functions, including various ranging methods used in a vehicle "welcome mode" or for remote vehicle control features such as remote park assist, may be performed without encryption. In these cases, it may be problematic to use encrypted communication or to perform cryptographic challenges to the device because of the increased battery drain. Where the remote device is a key fob, additional security measures such as encryption or cryptographic challenges can cause the battery life to degrade quickly.

As a result of the unencrypted nature of some vehicle communications, the vehicle is open to potential attack. For example, a would be attacker may spoof the vehicle into thinking that an authorized key is present, and allow control of the vehicle. This can be done in several ways, two of which are a "Replay" attack and a "Relay" attack. A Replay attack can include an attacking device recording a valid or authorized device's communication with the vehicle, and replaying the message at a later time. If the attacker repeatedly replays the message, the vehicle battery can drain. A Relay attack can include an attacker acting in the middle of the vehicle and an authorized device. The middle man attempts to communicate with the vehicle, which transmits various information as a check to determine if the device is authorized. The middle man forwards this information to another device placed near the authorized device. The middle man can then relay the appropriate signals back to the vehicle, thereby gaining control of the vehicle with an unauthorized device even though the authorized device is far away and out of the normal range of communication with the vehicle.

With these issues in mind, example embodiments of the present disclosure attempt to provide relatively low power systems and methods for ensuring that a device communicating with the vehicle is authorized, and that a replay or relay attack has not occurred. To accomplish this, example embodiments may include first receiving a signal from a remote device attempting to gain access to the vehicle. The vehicle may then vary the gain in a low frequency communication signal with the remote device, following a random pattern to determine whether the remote device responds in real time. For example, by varying the gain from 50% to 100% and back, the expected response signal strength from the remote device should follow the same pattern. If the response does not change, then the vehicle may perform additional checks to determine whether an attack is in progress.

The additional checks can include various techniques. In a first example, the vehicle may analyze the response signal to determine whether the response corresponds to a remote device that is moving in space at a normal rate. In a second example, the vehicle may receive a device counter value from the remote device, and compare it to a store profile. In some replay attacks, the attacking device pretends to by an authorized device. The vehicle can save previous device counter values of the authorized device, and compare to the newly received device counter value. If the same device counter value is used, that may indicate that the message received from the remote device has been replayed (i.e., a replay attack). In a third example, the vehicle may determine one or more characteristics of the remote device such as the location mean, variance, or rate of change. These values can then be compared to a stored profile, to determine whether they are too similar to prior values. If the location mean, variance, or rate of change for a given period of time is identical or too similar to stored values, which may indicate that a replay attack has occurred. In a fourth example, the vehicle may perform a time of flight analysis, transmitting a signal to the remote device and measuring an amount of time until a response is received. If a relay attack is occurring, the time will be larger than a threshold time normally needed to communicate within the normal range of the vehicle.

If the security check fails (i.e., a replay or relay attack is suspected), the vehicle can prevent that device from continuing to drain the vehicle battery (i.e., prevent further communication with the device), transmit an alert to the vehicle owner's device, transmit an alert to an authorized key fob, or take some other appropriate action. Further, if vehicle movement is in progress, such as a remote parking assist maneuver, the vehicle can halt movement and/or prevent further control of the vehicle by the remote device.

FIG. 1 illustrates a vehicle 100, which may include one or more components including a communication system 102 and a processor 110. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components, which may be described in further detail below.

Communication system 102 of vehicle 100 may be configured to enable communication between vehicle 100 and one or more devices or systems, via one or both of wireless and wired communication paths. Communication system 102 may include one or more antennas for communication with various devices or systems. The devices with which communication system 102 communicates may include key fobs, mobile phones, tablets, computers, servers, cell towers, infrastructure, other vehicles, and more.

In some embodiments, communication system 102 may include an antenna configured for low frequency communication. The low frequency antenna may enable communication with a remote device attempting to unlock or gain access to the vehicle (e.g., a vehicle unlocking device), such as a key fob, mobile phone, and others.

FIG. 1 illustrates an owner 120 of vehicle 100, having a key fob 124 and a smartphone 122. Either or both of the key fob 124 and the mobile phone 122 may act as an unlocking device for vehicle 100. In the scenario shown in FIG. 1, the owner 120 may be leaving vehicle 100, having just parked it in a parking spot. The attacker may then arrive, and attempt to gain access to vehicle 100 (or drain the battery, or take some other action) using attack device 104.

When a device initiates communication with the communication system 102, vehicle 100 may not know initially whether the device is an authentic or designated key fob, or whether it is an attack device. As described herein, a device at this stage may be called a vehicle unlocking device. Further, a designated or authorized device may be a device that has been designed, manufactured, or otherwise configured to operate and communicate with the vehicle 100 in an approved manner. This can include devices that have previously been granted access by the vehicle manufacturer, or "after-market" devices that have been approved.

Communication system 102 may communicate with various remote devices using one or more protocols, such as low frequency, high frequency, WiFi, Bluetooth, Bluetooth Low Energy (BLE), and more. Communication system 102 transmit and receive signals that can be used to determine various information about the devices. For instance, a received signal strength indication (RSSI) can be used to determine a distance from the vehicle, a location (i.e., via triangulation, time of flight, or some other technique), movement speed and/or direction, and various other characteristics of a given device.

FIG. 1 also illustrates that vehicle 100 includes a processor 110, configured to control one or more feature of the vehicle 100 and/or communication system 102. For example, during communication between communication system 102 and vehicle unlocking device 104, processor 110 may be configured to vary the gain in one or more transmitted signals. The transmitted signals may be transmitted via a low frequency antenna used to communicate between the devices, or may be some other frequency and/or may be transmitted by some other antenna or antennas.

Device 104 may then response, and the response may be received by communication system 102 and/or processor 110. Before or during transmission of the varied gain signal, processor 110 may determine an expected device response based on the change in gain over time. For example, the gain may be varied according to a predetermined pattern, a random pattern, or in any other manner. Device 104 is expected to respond in a corresponding or matching manner. As such, the received response should match the expected response. In some embodiments, where the RSSI is determined, the gain variance should produce a corresponding or matching change in the RSSI.

The gain may be switched from a low value to a high value (e.g., 50% to 100%) and back multiple times within a short time frame. The timing and difference between the high and low values can be any value, but may be tied to or dependent upon making sure that the changes are faster than what a human could reproduce via movement of the device. Further, rather than switching between two values (e.g. 50% and 100%), the gain may be changed to follow a pattern or signal, switching between many different gain values over time.

In some examples, RSSI values can be used to determine a distance between the communication system 102 antenna and the device 104. When the gain is varied and the response is determined, the processor 110 may want to avoid making a determination that the response doesn't match based on variations due to large scale movement of the device. For example, in a first scenario, the gain may be switched between 50% and 100% multiple times over the span of five seconds. The expected change in RSSI would match the switching between 50% to 100%, supposing minimal movement of the device during the five second time interval. However, if the device moves a significant amount during the five second interval (i.e., from six meters away to one meter away from the vehicle), there may be significant variation in the RSSI that is not due to the change in gain. And as such, the received response from the device will not match the expected response.

Embodiments of the present disclosure may modify or switch the gain between two or more values over a short period of time, such that the location of the device 104 does not vary larger than a threshold amount. For example, the gain may switch between 50% and 100% 100 times (with random duration at each level) over the span of one second or less. This provides a balance between allowing enough time for multiple variations in RSSI to occur, while minimizing the time for the device to move with respect to the vehicle.

Processor 110 may also be configured to determine, based on response, whether device 104 is a suspected attack device attempting to gain unauthorized access to vehicle 100. This may be done by comparing the variation in the RSSI in the response to an expected variation in the RSSI.

In some examples, the response from the vehicle unlocking device 104 comprises a received signal strength indication (RSSI), and the processor 110 is configured to determine that the vehicle unlocking device 104 is unauthorized based on a comparison between (i) an expected RSSI variation based on the gain in the low frequency signal, and (ii) a received RSSI variation.

A typical replay attack might not have an RSSI change, but may instead correspond to a constant RSSI. By failing to respond to the gain variation and instead maintaining the same RSSI, processor 110 can determine that device 104 is not "live" and is a suspected attack device. The attacking device 104 may be replaying a recorded response independent from the gain variation of the communication system 102.

In some examples, processor 110 may store a profile corresponding to each approved or designated device. When device 104 initiates communication, processor 110 may not know whether device 104 is actually an approved device or is spoofing or pretending to be an approved device.

Each devices may respond differently to gain variations. As such, each profile stored by the vehicle 100 may have information relating to how the particular device responds to gain variations. Thus, when an attack device attempts to access vehicle 100, and processor 110 carries out the gain variation described above, the expected response may depend on the profile associated with the device 104 (regardless of whether or not device 104 is the device of the profile or is simply pretending to be).

If the received or determined response does not correspond to the expected response, processor 110 may determine that the vehicle unlocking device 104 is a suspected attack device. As noted above, two major attack methods are a relay attack and a replay attack. Other attack methods may be used or developed in the future as well. As such, this disclosure should not be understood as limiting with respect to the type of attack vector being used.

Responsive to determining that the device 104 is a suspected attack device, processor 110 may take one or more actions to further clarify or better determine whether the device is an attack device.

The gain variance described above may be a relatively low power technique for determining whether the device 104 is "live" and authorized, or whether the device is potentially unauthorized. Many authorized devices will respond appropriately to the low power gain variation described herein, meaning that the low power technique can weed out many approved devices without draining much power. However, some authorized devices may still fail to respond appropriately due to movement of the device, interference, or for various other reasons. Further, attack devices will fail. In these cases, an additional security check may be performed to determine with more certainty whether the device is approved or not. In other words, the gain variation can be used broadly to determine whether a device is suspected to be an attack device, but cannot provide 100% certainty. Additional security checks can then be used (with higher power consumption) to be more certain. The combination of low power initial determination and a higher power second determination can provide an overall lower power consumption, with very high certainty of whether a device is an attack device or not.

The security check can come in various forms. In a first example, the security check may include determining, based on the RSSI, that movement of device 104 is within the normal range of a human. The processor may remove variation in the RSSI caused by the gain variation. After this removal, the RSSI response should still correspond to movement of the device 104 within a normal variation (e.g., within the expected range a human could move during the time interval received). The determined movement of the device will be compared to what is humanly possible regarding movement speed, direction changes, jumps in position, etc. High speed movement can indicate that the response is pre-recorded, similar to jumps in position, and other deviations in the response.

Some embodiments may also include determining an angle of arrival of the signal. The angle of arrival may be monitored over time to determine whether there has been a discontinuous jump in position or other unexpected positional change.

In a second example, the security check may include comparing a device counter value received from device 104. Messages between vehicle 100 and device 104 may cause corresponding device counters to increment. For instance, the counter may increment each time a message or signal is transmitted or received. The counter value may be part of a given message that is transmitted.

Vehicle 100 may store device counter values (e.g., corresponding to the profile saved for each device). Communication between vehicle 100 and device 104 may be cyclical (i.e., repeated requests for information may be sent and received to ensure the device is authorized)

Where the device 104 is authorized, the vehicle 100 can expect that the device counter value will increment accordingly as messages are transmitted and received. However, if device 104 is spoofing by repeat attack, the device counter value may be the same each time a message is sent.

The security check can include determining whether the device counter is updating appropriately, and that the device counter is not within some threshold of an expected value. If the device counter is not incrementing, or a device counter value is continuously received, that may indicate that a repeat attack is in progress. In one example, the security check comprises receiving a device counter value from the vehicle unlocking device 104; and comparing the device counter value to a stored profile associated with the vehicle unlocking device 104, wherein the stored profile comprises one or more historical device counter values.

In another example, the security check may include determining one or more device characteristics of the device 104 based on the response, and comparing the one or more device characteristics to a stored profile associated with the device 104.

As noted above, each device authorized or designated for use with the vehicle 100 may have a corresponding profile stored by the vehicle 100. The profile may include a history of communication with vehicle 100, and/or various information about the device during that communication such as how the device responds to certain signal variations (e.g., gain variations), as well as the location mean, variance, movement speed, and other metrics during the prior communication. Vehicle 100 may build a profile over time of each device, how it responds to various signals, and metric associated with the device during that communication. This may include temporal and spectral characteristics, such that an RF fingerprint may be constructed for each application. The profile may also employ machine learning techniques to extract higher order features, and then utilize a pattern recognition engine for comparison robustness.

The security check may include receiving one or more characteristics from the device. Characteristics may include location mean, location variance, location rate of change over a given period of time. If these characteristics match stored values too closely, that can indicate that the currently received messages are replayed messages from an earlier communication session. This is true because it is highly unlikely that the location mean, variance, and/or rate of change will be exactly the same for two different communication sessions between the vehicle 100 and the device 104. There will at least be a minor difference reflected in these device metrics. The processor 110 may compare the received characteristics to the stored values in the device profile, and determine whether they are within a threshold of similarity. This threshold of similarity may be large or small, depending on the accuracy of the values and how confident the vehicle wants to be. For example, the threshold may be a similarity up to two decimal places, or some other consideration.

The above three described security check techniques may be used to determine whether a replay attack is being carried out by the device 104.

A fourth security check can include performing a time of flight analysis. This can be particularly useful where the attack is a relay attack. The time of flight analysis can include performing a round trip measurement of a signal transmitted to the device 104 and the response received back. In one example, an ultra wide band time of flight analysis may be done. This can include the communication system 102 transmitting a 3.1-10 ghz pulse to device 104. Device 104 may then response with a different pulse on the same frequency band. Once the time of flight is determined, the processor 110 can determine a distance the signal traveled. If the device 104 is performing a relay attack, the distance will be much greater than the distance determined based on the RSSI values.

In some examples, the time of flight analysis can be done using ultra wide band frequency. In other examples, the analysis can be done using low frequency, high frequency, ultra high frequency, WiFi, Bluetooth, or any other communication protocol or technique. One constrain is that the time of flight analysis must be able to produce an accuracy in distance such that the processor can determine whether a relay attack is occurring.

Four example security check techniques have been disclosed herein. It should be understood that other techniques and security checks can be performed as well. Each security check is a technique used to increase the certainty of whether the device 104 is an attack device.

In some examples, the security check maybe a single technique described herein. In other examples, the security check may be a combination of two or more techniques.

The processor may determine whether the device 104 is an attack device based on the security check, and responsively transmit an alert or take some other action. The alert may be transmitted to the device 104, to a mobile device 122 or key fob 124 associated with the vehicle owner 120, to a server, or to any other device. The alert may indicate that an attempted attack has been carried out and indicate what type of attack was done. In some examples, the alert may simply indicate that the device should be held still or a different unlocking device should be used.

In some examples, the alert may be transmitted via a transmission control unit coupled to communication system 102 and/or processor 110. In some examples, the vehicle horn, lights, or other system may be activated to indicate that an attack has occurred.

In some examples, the vehicle 100 may responsively maintain a locked status or lock the vehicle. Further, the vehicle may prevent or halt movement (e.g., when there is an ongoing remote park assist operation). Remote control of vehicle movement may be allowed during analysis (i.e. while the gain variation and security check are performed), but stopped after a determination is made that the device is an attack device.

In some examples, the vehicle 100 may store data corresponding to the device 104, and/or any communication with the device 104 for later use. For instance, the next time that the device 104 or an authorized device that was being spoofed by device 104 attempts to connect to vehicle 100, the vehicle 100 may require additional security, may transmit an alert to one or more devices, or may take some other action.

FIG. 1 illustrates an example block diagram 200 showing electronic components of vehicle 100, according to some embodiments. In the illustrated example, the electronic components 200 include an on-board computing system 202, an infotainment head unit 220, communication system 102, sensors 240, electronic control unit(s) 250, and vehicle data bus 260.

The on-board computing system 202 may include a microcontroller unit, controller or processor 110 and memory 212. The processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 212 includes multiple kinds of memory, particularly volatile memory and non-volatile memory.

The memory 212 may be a non-transitory computer-readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer-readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 222, and user interface 224, to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with on-board computing system 202. Additionally, the infotainment head unit 220 may display the infotainment system on, for example, a center console display of vehicle 100.

Communications system 102 may include wired or wireless network interfaces to enable communication with one or more internal or external systems, devices, or networks. Communications system 102 may also include hardware (e.g., processors, memory, storage, etc.) and software to control the wired or wireless network interfaces. In the illustrated example, communications system 102 may include a Bluetooth® module, a GPS receiver, a dedicated short range communication (DSRC) module, an Ultra-Wide Band (UWB) communications module, a WLAN module, and/or a cellular modem, all electrically coupled to one or more respective antennas.

The cellular modem may include controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); and Wireless Gigabit (IEEE 802.11ad), etc.). The WLAN module may include one or more controllers for wireless local area networks such as a WiFi® controller (including IEEE 802.11 a/b/g/n/ac or others), a Bluetooth® controller (based on the Bluetooth® Core Specification maintained by the Bluetooth® Special Interest Group), and/or a ZigBee® controller (IEEE 802.15.4), and/or a Near Field Communication (NFC) controller, etc. Further, the internal and/or external network(s) may be public networks, such as the Internet; a private network, such as an intranet; or combinations thereof, and may utilize a variety of networking protocols now available or later developed including, but not limited to, TCP/IP-based networking protocols.

Communications system 106 may also include a wired or wireless interface to enable direct communication with an electronic device (such as devices 104, 122, and 124). An example DSRC module may include radio(s) and software to broadcast messages and to establish direct connections between vehicles and between vehicles and one or more other devices or systems. DSRC is a wireless communication protocol or system, mainly meant for transportation, operating in a 5.9 GHz spectrum band.

Sensors 240 may be arranged in and around vehicle 100 in any suitable fashion. Sensors 240 may include a backup camera, ultrasonic sensors, and more.

The ECUs 250 may monitor and control subsystems of vehicle 100. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles may have seventy or more ECUs 250 located in various locations around the vehicle communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252, the body control unit 254, and the transmission control unit 256.

The telematics control unit 252 may control tracking of the vehicle 100, for example, using data received by a GPS receiver, communication system 102, and/or one or more sensors 240. The body control unit 254 may control various subsystems of the vehicle. For example, the body control unit 254 may control a trunk latch, windows, power locks, power moon roof control, an immobilizer system, and/or power mirrors, etc. The transmission control unit 256 may enable communication with one or more external devices, such as the mobile phone 122 of the owner 120 of the vehicle.

Vehicle data bus 260 may include one or more data buses, in conjunction with a gateway module, that communicatively couple the on-board computing system 202, infotainment head unit 220, communications system 102, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) bus (ISO 11898-7) or a combination of CAN and CAN-FD.

Figure 3:
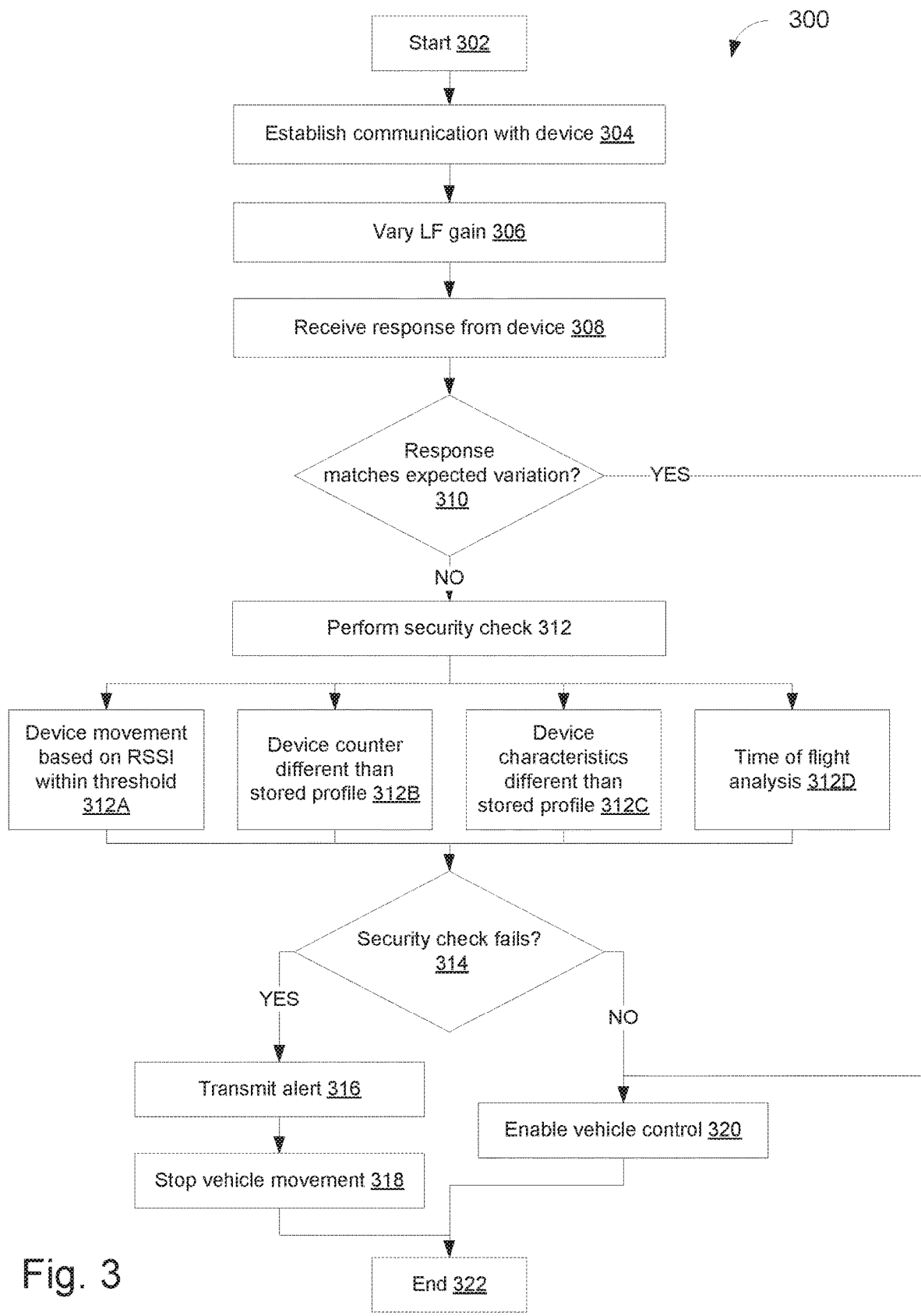
FIG. 3 illustrates a flowchart of an example method according to embodiments of the present disclosure.

FIG. 3 illustrates a flowchart of an example method 300 according to embodiments of the present disclosure. Method 300 may enable a vehicle to determine with a low power technique whether an external device is an attack device attempting to gain unauthorized access, and take appropriate action.

Figure 2:
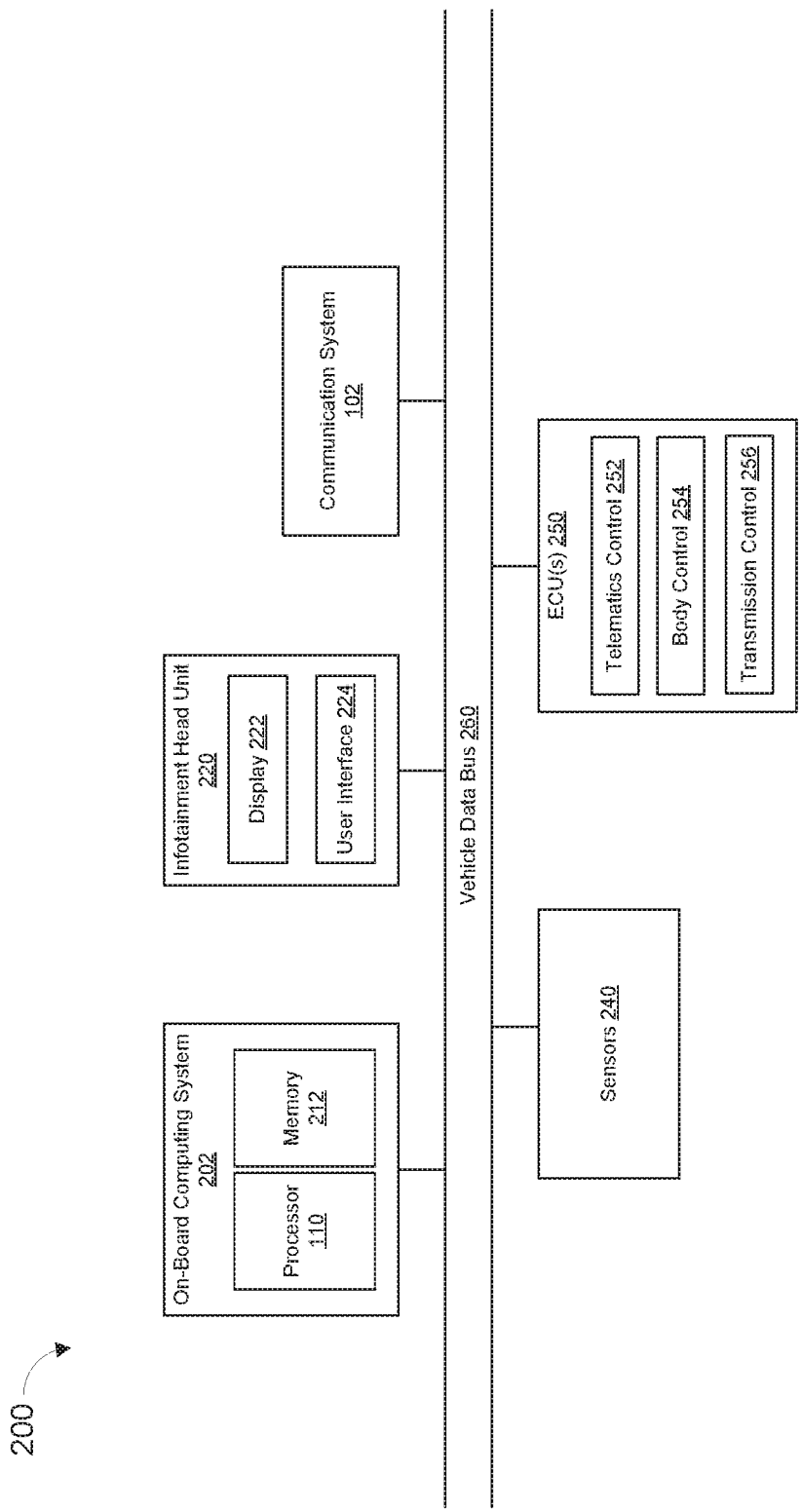
FIG. 2 illustrates a block diagram of electronic components of the vehicle of FIG. 1.

The flowchart of FIG. 3 is representative of machine readable instructions that are stored in memory (such as memory 212) and may include one or more programs which, when executed by a processor (such as processor 110) may cause vehicle 100 to carry out one or more functions described herein. While the example program is described with reference to the flowchart illustrated in FIG. 3, many other methods for carrying out the functions described herein may alternatively be used. For example, the order of execution of the blocks may be rearranged or performed in series or parallel with each other, blocks may be changed, eliminated, and/or combined to perform method 300. Further, because method 300 is disclosed in connection with the components of FIGS. 1-2, some functions of those components will not be described in detail below.

Method 300 may start at block 302. At block 304, method 300 includes establishing communication with an external device. This device may be the vehicle unlocking device attempting to gain access to the vehicle.

At block 306, method 300 may include varying the low frequency gain. This may include randomly varying the gain from a low value to a high value, or adjusting the gain according to some other random function including more than two values (i.e., more than just high and low).

At block 308, method 300 may include receiving the response from the external device. At block 310, method 300 may include determining whether the device response matches or is within a threshold difference from an expected variation. The vehicle may determine an expected response based on the gain variance. IF the response fails to match or be within a threshold difference, method 300 may proceed to block 312.

However, if the received response matches the expected response, method 300 may proceed to block 320.

At block 312, method 300 may include performing an additional security check to determine whether the external device is an attack device or not. The security check may include one or more of the checks shown in blocks 312A-D.

At block 312A, the security check may include determining whether device movement is within a threshold, based on the received signal strength indication from the device. The device movement should be humanly possible, such that there are no movements faster than a given humanly possible threshold, and no jumps in position that are greater than humanly possible.

At block 312B, the security check may include determining whether a device counter received from the external device matches a stored device counter value. If the counter values match, that may indicate that the message has been replayed from a previous communication session.

At block 312C, the security check may include determining whether one or more device characteristics match stored values. For example, the external device location mean, variance, and rate of change may be compared to historical values. If the values match too closely or at greater than a threshold precision, that may indicate that the message has been replayed from a previous communication session.

At block 312D, the security check may include performing a time of flight analysis to determine the distance that a signal travels from the vehicle to the external device (and/or to a relay device) and back. If the distance that the signal travels is larger than the expected distance based on the RSSI values, that may indicate that a relay attack is in progress whereby the messages are relayed from an authorized device to an attack device nearby the vehicle.

Method 300 may include performing one or more of Block 312A-D simultaneously or in succession. In some cases only one of blocks 312A-D may be performed, while in other cases two, three, or all four may be performed.

At block 314, method 300 may include determining whether the security check has failed. A security check failure corresponds to a determination that the external device is an attack device, and that a relay attack, replay attack, or some other spoofing attack has occurred.

If the security check fails, method 300 may include transmitting an alert at block 316. The alert may indicate that an attack has been detected, hat an attempt to access the vehicle has failed, and/or various other information. The alert may be transmitted to the external device itself, and/or to various other devices or systems communicatively coupled to the vehicle 100 (such as an owner's key fob, smartphone, or computer).

At block 318, method 300 may include stopping vehicle movement and/or preventing the vehicle from moving. This can occur where the vehicle is in progress executing a remote parking maneuver.

If instead the security check passes, and it is determined that an attack has not occurred, the vehicle may enable control by the external device at block 320. Method 300 may then end at block 322.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a communication system having a low frequency antenna for communication with a vehicle unlocking device; and
a processor configured to:
vary a gain in a low frequency signal transmitted to the vehicle unlocking device via the communication system;
determine, based on a response from the vehicle unlocking device, that the vehicle unlocking device is a suspected attack device;
responsively perform a security check on the vehicle unlocking device; and
transmit an alert based on the security check;
wherein the response from the vehicle unlocking device comprises a first received signal strength indication (RSSI), and wherein the processor is further configured to determine that the vehicle unlocking device is unauthorized based on a comparison between (i) an expected RSSI variation based on the gain in the low frequency signal, and (ii) a received RSSI variation, wherein the security check comprises:
  removing variation in the first RSSI caused by a gain variation to generate a second RSSI; and
  determining, based on the second RSSI, that movement of the vehicle unlocking device is outside an expected range of human movement.

2. The vehicle of claim 1, wherein the processor is further configured to randomly vary the gain in the low frequency signal.

3. The vehicle of claim 1, wherein the security check comprises:
  receiving a device counter value from the vehicle unlocking device; and
  comparing the device counter value to a stored profile associated with the vehicle unlocking device, wherein the stored profile comprises one or more historical device counter values.

4. The vehicle of claim 1, wherein the security check comprises:
  determining one or more device characteristics of the vehicle unlocking device based on the response; and
  comparing the one or more device characteristics to a stored profile associated with the vehicle unlocking device.

5. The vehicle of claim 4, wherein the one or more device characteristics comprise one or more of a location mean, a location variance, a location rate of change, and spectral information.

6. The vehicle of claim 1, wherein the security check comprises:
  performing a time of flight analysis based on a signal transmitted to the vehicle unlocking device.

7. The vehicle of claim 6, wherein the time of flight analysis comprises an ultra wide band time of flight analysis.

8. The vehicle of claim 1, wherein the processor is further configured to transmit the alert to a mobile device corresponding to the vehicle.

9. The vehicle of claim 1, wherein the processor is further configured to stop ongoing movement of the vehicle responsive to performing the security check.

10. A method comprising:
  varying, by a processor of a vehicle, a gain in a low frequency signal transmitted to the vehicle unlocking device via a communication system of the vehicle;
  determining, based on a response received by the vehicle from the vehicle unlocking device, that the vehicle unlocking device is a suspected attack device;
  responsively performing a security check on the vehicle unlocking device; and
  transmitting an alert based on the security check;
  determining that the vehicle unlocking device is the suspected attack device based on a comparison between (i) an expected received signal strength indication (RSSI) variation based on the gain in the low frequency signal, and (ii) a received RSSI variation, wherein the response from the vehicle unlocking device comprises a first RSSI;
  wherein the security check comprises:
    removing variation in the first RSSI caused by a gain variation to generate a second RSSI; and
    determining, based on the second RSSI, that movement of the vehicle unlocking device is outside an expected range of human movement.

11. The method of claim 10, further comprising randomly varying the gain in the low frequency signal.

12. The method of claim 10, wherein the security check comprises:
  receiving a device counter value from the vehicle unlocking device; and
  comparing the device counter value to a stored profile associated with the vehicle unlocking device, wherein the stored profile comprises one or more historical device counter values.

13. The method of claim 10, wherein the security check comprises:
  determining one or more device characteristics of the vehicle unlocking device based on the response; and
  comparing the one or more device characteristics to a stored profile associated with the vehicle unlocking device.

14. The method of claim 13, wherein the one or more device characteristics comprise one or more of a location mean, a location variance, a location rate of change, and spectral information.

15. The method of claim 10, wherein the security check comprises:
  performing a time of flight analysis based on a signal transmitted to the vehicle unlocking device.

16. The method of claim 10, wherein the processor is further configured to transmit the alert to a mobile device corresponding to the vehicle.

* * * * *